Patented Oct. 28, 1952

2,615,922

UNITED STATES PATENT OFFICE 2,615,922

SYNTHESIS OF VITAMIN A AND INTERMEDIATES THEREFOR

Albert Carl Starke, Jr., Easton, Pa., assignor to General Aniline & Film Corporation, New York, N. Y., a corporation of Delaware No Drawing. Application December 17, 1949, Serial No. 133,663

11 Claims. (Cl. 260—598)

This invention relates to the synthesis of vitamin A and of novel intermediates therefor.

In accordance with the disclosure of Van Dorp et al. (Rec. Trav. Chim. des Pays-Bas, 65, 1946, page 338), a vitamin A acid, showing biological activity, was prepared from β-ionone. The procedure involved condensation of β-ionone with γ-bromocrotonic acid ester in the presence of zinc, dehydration and saponification of the resulting hydroxy ester to ionylidene crotonic acid, and reduction of the latter with lithium methyl, followed by hydrolysis, to form a C18 ketone having the following formula:

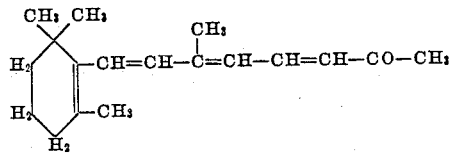

By condensation of this ketone with bromoacetic ester in the presence of zinc, and dehydration and saponification of the resulting hydroxy ester, vitamin A acid was produced.

According to Schwarzkopf et al. (Helv. Chim. Acta, 32, 1949, page 452), the ester of vitamin A acid, produced by the foregoing procedure was reduced to vitamin A (the corresponding alcohol) by reduction with lithium aluminum hydride.

According to Dutch Patent 62,738, the aforesaid C18 ketone can be converted to an aldehyde of the vitamin A series by reaction with metallo derivatives or Grignard reagents of alkyl- or aryl-oxyacetylene, followed by selective reduction of the acetylenic bond to an olefinic bond, or by reaction of the ketone directly with a metallo derivative of an alkyl- or an aryl-oxyethene, followed by hydrolysis of the alkyl- or aryl-oxy group, accompanied by rearrangement to form the desired hydroxy aldehyde of the vitamin A series. The latter can be hydrated and hydrogenated to obtain vitamin A.

I have now discovered that vitamin A and valuable intermediates therefor can be prepared from the aforesaid C18 ketone by a different procedure, constituting a highly convenient and economical method for the synthesis of vitamin A and intermediates therefor.

It is accordingly an object of my invention to provide a novel procedure for preparing vitamin A, and further, to provide a series of novel intermediates for this procedure.

In accordance with my invention, the C18 ketone, formulated above, is treated with an orthoester of a carboxylic acid, especially an orthoformate, to form the corresponding ketal. The latter is then condensed with a vinyl ether in the presence of an acid condensing agent, to form an ether acetal, which yields vitamin A aldehyde upon hydration and dealcoholation. Vitamin A aldehyde, on reduction, yields the corresponding alcohol, which is vitamin A:

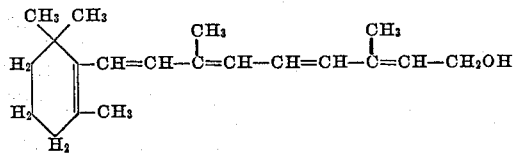

The reactions involved in the procedure of this invention are as follows:

1. Reaction of the C18 ketone with an ortho-carboxylic ester:

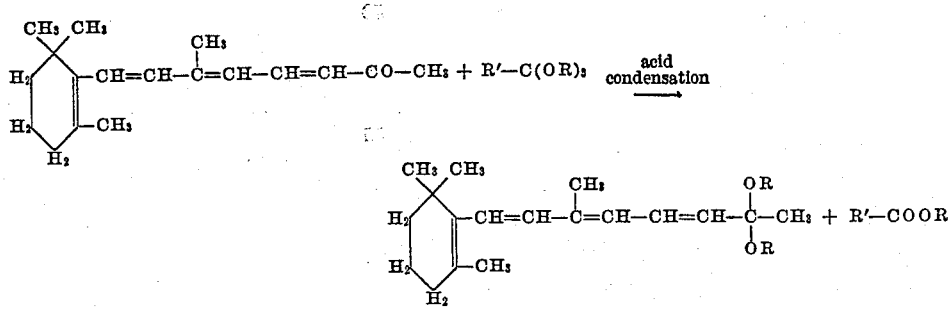

(R being an alkyl group, and R'—CO— representing the radical of an organic carboxy acid).

2. $+ R-O-CH=CH_2$ $\xrightarrow{\text{acid condensation}}$

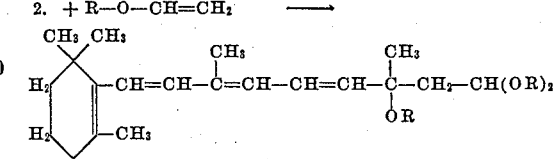

(the R's representing alkyl groups).

3. 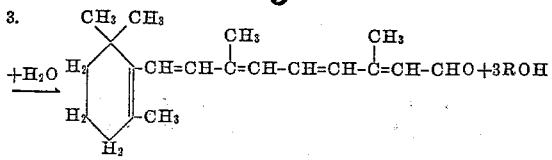

The aldehyde thus produced can be reduced to vitamin A, e. g. by reaction with aluminum isopropylate, as indicated by the following reaction:

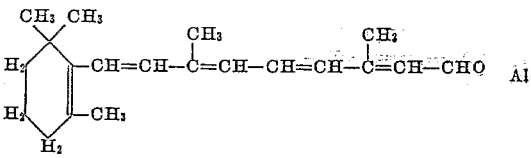

(Vitamin A)

The following series of examples illustrate preferred procedures which may be employed for carrying out the process of my invention. Parts are by weight unless otherwise indicated. The numbers of the examples correspond to the numbers of the equations set out above.

*Example 1*

25.8 parts (0.1 mol) of the $C_{18}$ ketone, formulated above, and prepared by the procedure of Van Dorp et al. (loc. cit.), are mixed with 21.2 parts (0.2 mol) of methyl-ortho-formate containing 0.05 part of the diethyl ether complex of $BF_3$ (i. e., $BF_3$ etherate) at a temperature of 25 to 45° C. The reaction mixture is allowed to stand for 2 to 3 hours at a temperature within the latter range. The reaction mixture is then dissolved in ether, and the $BF_3$ catalyst neutralized with a small amount of sodium ethylate or ethanolamine. The ether solution is washed with water, separated from the aqueous layer and dried over anhydrous sodium sulfate. The ether and the volatile components of the mixture are removed by distillation, and the high-boiling residue is fractionated by distillation under highly reduced pressure (e. g. so-called "molecular" distillation) to obtain the dimethyl ketal corresponding to the $C_{18}$ ketone, having the formula:

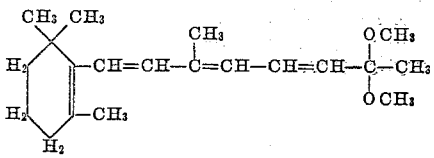

*Example 2*

30.4 parts (0.1 mol) of the dimethyl ketal of the $C_{18}$ ketone, produced in accordance with the preceding example, are mixed with 0.075 part (0.0005 mol) of $BF_3$ etherate. The mixture is heated to 45° C., and 2 parts (0.035 mol) of methyl vinyl ether are gradually introduced over a period of 15 minutes. The reaction mixture is stirred at 45 to 50° C. for 2 hours, then cooled, and the $BF_3$ catalyst neutralized by addition of a small amount of sodium methylate. The reaction mixture is fractionally distilled under highly reduced pressure (molecular distillation) to recover separate fractions of the unreacted dimethyl ketal, and the reaction product which is a methyl ether acetal having the following formula:

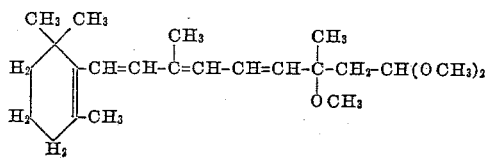

*Example 3*

36.2 parts (0.1 mol) of the ether acetal produced in Example 2 are mixed with 3.6 parts (0.2 mol) of water containing 0.05 part of paratoluene sulfonic acid. The mixture is heated in a distillation apparatus provided with a fractionating column in an inert atmosphere (e. g. nitrogen) to 50° C., and vigorously agitated at this temperature for one-half hour. The temperature

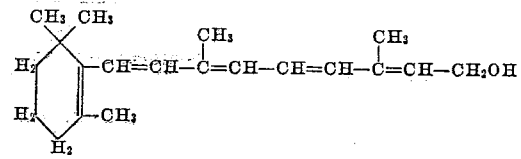

is then gradually raised to 65° C. until distillation of methanol virtually ceases. The residue is then taken up in ether, the ethereal solution washed with dilute aqueous sodium carbonate, then with water, and then dried over anhydrous sodium sulfate. These operations are preferably carried out while maintaining an atmosphere of nitrogen or other inert gas. The ether is evaporated from the solution in the inert atmosphere, leaving as a residue, vitamin A aldehyde having the following formula:

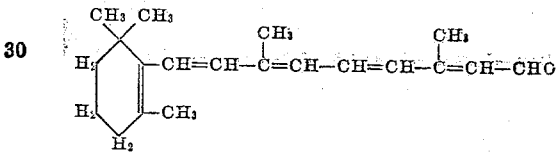

In order to prepare vitamin A, the aldehyde obtained according to Example 3 (about 30 parts) can be dissolved in 300 parts of absolute isopropyl alcohol, the solution heated to boiling in a nitrogen atmosphere in a reflux apparatus, and 15 parts of aluminum isopropylate added to the mixture. Isopropyl alcohol is gradually distilled from the mixture, and replaced therein with fresh isopropyl alcohol. When the distillate no longer yields a positive test for acetone (e. g. by formation of crystalline para-nitrophenyl hydrazone on treatment with a solution of para-nitrophenylhydrazine in glacial acetic acid) the mixture is cooled, diluted with petroleum ether (B. P. 30 to 40° C.), and extracted with 5% aqueous phosphorous acid. The aqueous extract is extracted with additional petroleum ether, and the combined petroleum ether extracts are dried over anhydrous sodium sulfate, yielding a solution of vitamin A which can be recovered by chromatographic absorption from the petroleum ether solution on aluminum oxide, and elutriated from the adsorbent with a mixture of benzene and petroleum ether. A pure product can be obtained in this manner having properties similar to vitamin A obtained from natural sources.

In carrying out the various steps of the procedure illustrated in the foregoing examples, numerous variations and modifications can be made.

Thus, in the procedure of Example 1, the ortho ester employed for conversion of the $C_{18}$ ketone to the corresponding ketal can be an ortho ester of a lower fatty carboxylic acid other than formic acid, e. g. it can be an ortho-acetate, ortho-propionate or ortho-butyrate. The ortho ester may contain the radicals of other monohydric alcohols than methyl alcohol, e. g. ethyl, propyl, butyl or benzyl alcohol. Ortho esters of lower aliphatic carboxy acids can also be used in which the esterifying alcohols include a dihydric alcohol such as 1,3-propanediol, together with a monohydric alcohol, as found, for example, in 2-ethoxy-1,3-dioxolane, which is an ortho-formic ester of ethyl alcohol and 1,3-propanediol. Ortho esters of methyl alcohol are preferred in order to maintain the molecular weight of the resulting ketal as low as possible, and thereby facilitate its purification by distillation.

The proportions of the ortho ester and the C₁₈ ketone can be varied, but it is convenient to employ a molecular excess of ortho ester with respect to the ketone, a mol ratio of about 2:1 being suitable, as illustrated in Example 1.

An acid condensation catalyst is employed to promote ketal formation, such catalysts including $BF_3$, $BF_3$ etherate, $BCl_3$, $SnCl_4$, $TiCl_4$, or $H_2SO_4$, or acid-reacting salts such as ammonium chloride or ammonium nitrate, a suitable proportion of catalyst being from 0.0001 to 0.01 mol per mol of ortho ester. The temperature employed in this reaction can vary from 0 to 50° C. Higher temperatures within this range tend to accelerate the reaction, and in general, provide more satisfactory operating conditions.

The methyl vinyl ether employed in Example 2 is preferred, but can be replaced by other vinyl ethers, such as the corresponding ethyl, propyl, isopropyl, butyl and benzyl ethers. The condensation reaction of this example is carried out under anhydrous conditions. An inert solvent or diluent can be used, but it is more advantageous to bring the reagents together in the absence of a diluent so as to afford maximum opportunity for rapid combination of the ketal with the vinyl ether. To limit undesirable side reactions, especially polymerization of the vinyl ether, a substantial excess of the ketal is preferably maintained in the reaction mixture throughout the condensation. Thus, in general, it is preferred to employ at least 2 and preferably about 3 mols of the ketal for each mol of vinyl ether introduced. By reason of the inhibition of polymerization of the vinyl ether, a higher ultimate yield can be obtained when the unreacted ketal is recovered and recycled to a subsequent condensation.

The condensation reaction of Example 2 is promoted by inclusion of acid-reacting anhydrous condensing agents as catalysts, as, for example, those used in Example 1. The proportion of catalyst employed can be from 0.0001 to 0.1 mol per mol of the ketal, and is preferably between 0.0025 and 0.01 mol. The temperature of the condensation can be varied between 0 to 100° C., but is preferably not higher than 50° C. Vinyl methyl ether (B. P. 5 to 6° C.) is a gas at room temperature, while higher molecular weight ethers are liquids. When the temperature employed is such that the vinyl ether is relatively volatile, super-atmospheric pressure can be used to avoid excessive volatilization of the ether from the reaction mixture.

In carrying out the dealcoholation and hydrolysis of the ether ketal produced by condensation of the vinyl ether with the ketal of the C₁₈ ketone, as illustrated in Example 3, water is added to the ether acetal in at least an equimolecular amount. The amount of water added in excess is not critical, however, but it is convenient to add 2 to 3 mols of water per mol of ether acetal. A water-soluble acidic substance is employed as a catalyst for the hydrolysis and dealcoholation, preferably an organic non-volatile acid such as para-toluene sulfonic acid. However, other organic acids such as acetic acid can be used, or inorganic acids such as HCl, $H_2SO_4$, $H_3PO_4$, or water-soluble acid-reacting salts such as $NH_4Cl$, $ZnCl_2$, $NaHSO_4$, and the like. The amount of acid thus used is small, amounting, for example, to 0.001 to 0.1 mol per mol of water. The temperature is advantageously maintained at 50 to 100° C. In general, the temperature is preferably maintained at about the boiling point of the alcohol to be eliminated, within the aforesaid range. Since this step involves formation of a poly-unsaturated aldehyde, oxygen is preferably excluded during the reaction and the subsequent treatment, to avoid excessive losses from oxidation or polymerization of the product.

In preparing vitamin A from the vitamin A aldehyde, produced by the aforesaid dealcoholation and hydrolysis, an aluminate of a secondary alcohol (e. g. isopropanol, 2-butanol, or 2- or 3-pentanol) can be used. Aluminum isopropylate is particularly well suited, since the alcohol corresponding thereto, as well as the acetone produced therefrom are volatile and water-soluble, and can be readily removed from the reaction product by aqueous extraction. The reduction of the vitamin A aldehyde to vitamin A is carried out in alcoholic solution under anhydrous conditions, and the final product can be recovered, as indicated above, by extraction with hydrocarbon solvents.

Other variations and modifications which will be obvious to those skilled in the art can be made in the foregoing process without departing from the spirit or scope of this invention.

I claim:

1. In a process for the synthesis of vitamin A or of an intermediate therefor, the steps which comprise reacting a ketone having the following formula:

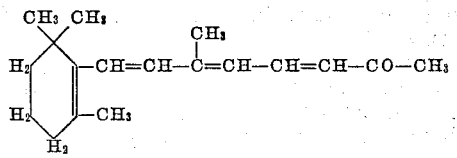

with an ortho-carboxylic acid ester to form the corresponding ketal, condensing the resulting ketal with 1 molecular equivalent of a vinyl ether to form an ether acetal having the following formula:

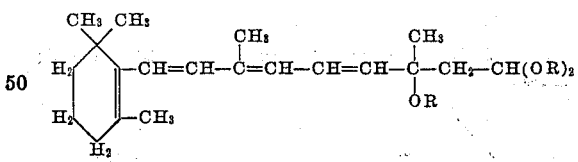

wherein the R's represent alkyl groups, and simultaneously dealcoholizing and hydrolyzing said ether acetal to form a polyolefinic aldehyde which yields vitamin A upon reduction with an aluminum alcoholate of a secondary alcohol.

2. In a process for the synthesis of vitamin A or of an intermediate therefor, the step which consists in reacting a C₁₈ ketone having the following formula:

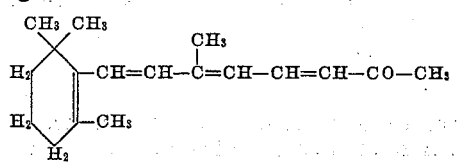

with an ortho-carboxylic acid ester in the presence of an acid condensation catalyst to form the corresponding ketal.

3. A process as defined in claim 2, wherein the ortho-carboxylic acid ester is methyl-ortho-formate and the catalyst is $BF_3$ etherate.

4. In a process for the synthesis of vitamin A or of an intermediate therefor, the step which consists in condensing a ketal having the following formula:

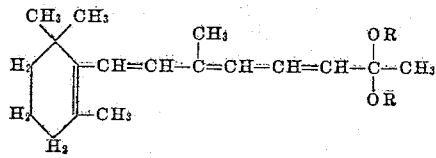

wherein R represents an alkyl group, with a vinyl alkyl ether in the presence of an acid condensation catalyst, to form an ether acetal having the following formula:

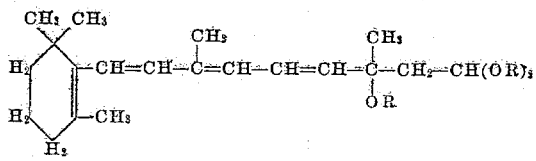

wherein the R's represent alkyl groups.

5. In a process for the synthesis of vitamin A or of an intermediate therefor, the step which consists in heating an ether acetal having the following formula:

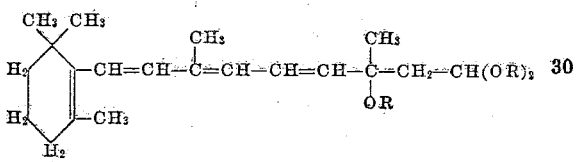

wherein the R's represent alkyl groups, with at least an equimolecular amount of water in the presence of a water-soluble acidic substance as the catalyst at a temperature of 50 to 100° C., in an inert non-oxidizing atmosphere, whereby said ether acetal is converted to a polyolefinic aldehyde having the formula:

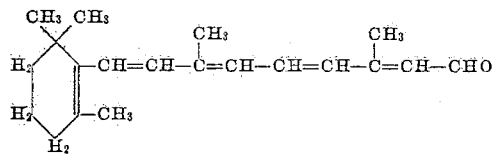

6. A ketal having the following general formula:

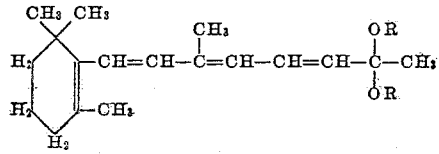

wherein the R's represent alkyl groups.

7. An ether acetal having the formula:

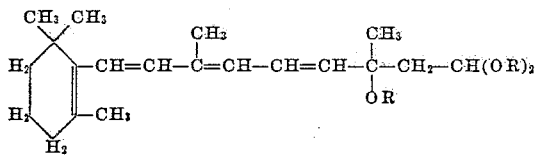

wherein the R's represent alkyl groups.

8. A ketal having the following formula:

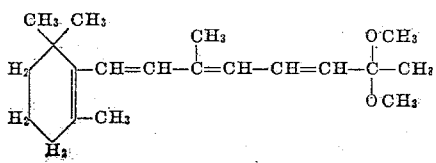

9. An ether acetal having the following formula:

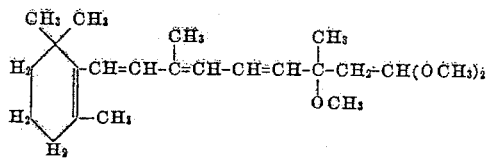

10. In a process for the synthesis of vitamin A or of an intermediate therefor, the step which consists in condensing a ketal having the following formula:

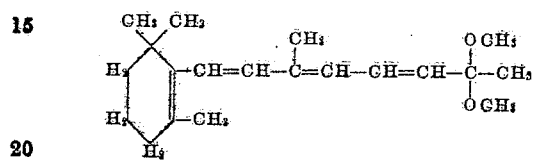

with vinyl methyl ether in the presence of $BF_3$ etherate as the catalyst to form an ether acetal having the following formula:

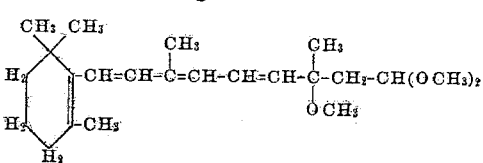

11. In a process for the synthesis of vitamin A or of an intermediate therefor, the step which consists in heating an ether acetal having the following formula:

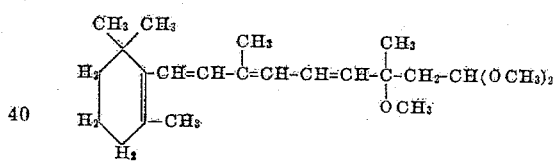

with at least an equimolecular amount of water in the presence of para-toluene sulfonic acid as a catalyst at a temperature of 50 to 100° C., in an inert non-oxidizing atmosphere, whereby said ether acetal is converted to a polyolefinic aldehyde having the formula:

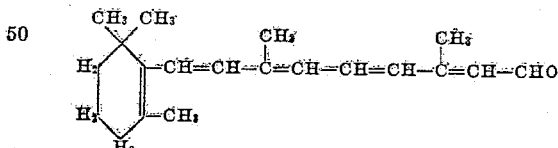

ALBERT CARL STARKE, Jr.

REFERENCES CITED

The following references are of record in the file of this patent:

UNITED STATES PATENTS

| Number | Name | Date |
|---|---|---|
| 2,487,525 | Copenhaver | Nov. 8, 1949 |

FOREIGN PATENTS

| Number | Country | Date |
|---|---|---|
| 744,344 | France | Apr. 18, 1933 |

OTHER REFERENCES

Whitmore, "Organic Chemistry," page 341, Van Nostrand Co., N. Y. (1937).

Van Dorp et al., Rec. Trav. Chim. des Pays-Bas, vol. 65, page 338 (1946).